US012720600B2

(12) United States Patent
Guo et al.

(10) Patent No.: US 12,720,600 B2
(45) Date of Patent: Aug. 25, 2026

(54) PRE-COLLISION SIGNALING ON INTER-UE COORDINATION RESOURCES

(71) Applicant: QUALCOMM Incorporated, San Diego, CA (US)

(72) Inventors: Hui Guo, Beijing (CN); Tien Viet Nguyen, Bridgewater, NJ (US); Gabi Sarkis, San Diego, CA (US); Kapil Gulati, Belle Mead, NJ (US); Sourjya Dutta, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/286,533

(22) PCT Filed: May 8, 2021

(86) PCT No.: PCT/CN2021/092397

§ 371 (c)(1),
(2) Date: Oct. 11, 2023

(87) PCT Pub. No.: WO2022/236477

PCT Pub. Date: Nov. 17, 2022

(65) Prior Publication Data

US 2024/0205977 A1 Jun. 20, 2024

(51) Int. Cl.
*H04W 74/00* (2009.01)
*H04W 74/0808* (2024.01)

(52) U.S. Cl.
CPC ..... *H04W 74/0825* (2013.01); *H04W 74/002* (2013.01)

(58) Field of Classification Search
CPC ..... H04L 1/1642; H04L 47/34; H04L 1/1607; H04W 28/06; H04W 28/082;
(Continued)

(56) References Cited

U.S. PATENT DOCUMENTS 12,088,517 B2 * 9/2024 Chae .................... H04L 1/1893
12,369,184 B2 * 7/2025 Xue .................... H04W 52/365
(Continued)

FOREIGN PATENT DOCUMENTS

CN 111670595 A 9/2020
WO 2020088756 A1 5/2020

OTHER PUBLICATIONS

International Search Report and Written Opinion—PCT/CN2021/092397—ISA/EPO1—Jan. 28, 2022.
(Continued)

*Primary Examiner* — Nathan S Taylor
(74) *Attorney, Agent, or Firm* — ArentFox Schiff, LLP

(57) ABSTRACT

In an aspect, the disclosure provides a method of wireless communication for a first user equipment (UE). The method may include decoding, at a first user equipment (UE), sidelink control information (SCI) transmitted by a plurality of second UEs reserving a set of resources for sidelink transmission to the first UE. The method may also include detecting, at the first UE, a potential resource collision between the plurality of second UEs at the set of resources based on decoding of the SCI. The method may further include generating a pre-collision message that identifies the set of resources that are susceptible to the resource collision. The method may further include transmitting the pre-collision message from the first UE to the plurality of second UEs.

20 Claims, 9 Drawing Sheets

(58) Field of Classification Search
CPC . H04W 28/0865; H04W 28/09; H04W 76/15; H04W 88/06; H04W 56/0045; H04W 56/00; H04W 56/0015; H04W 56/0065; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20
See application file for complete search history.

(56) References Cited

U.S. PATENT DOCUMENTS

| | | | | |
|---|---|---|---|---|
| 12,382,336 | B2 * | 8/2025 | Baek | H04L 1/188 |
| 2019/0098617 | A1 | 3/2019 | Li et al. | |
| 2019/0306923 | A1 * | 10/2019 | Xiong | H04L 27/261 |
| 2020/0229171 | A1 * | 7/2020 | Khoryaev | H04W 4/40 |
| 2020/0383088 | A1 * | 12/2020 | Min | H04W 72/0446 |
| 2021/0235328 | A1 * | 7/2021 | Hui | H04W 72/56 |
| 2022/0029756 | A1 * | 1/2022 | Sarkis | H04W 72/20 |
| 2022/0030575 | A1 * | 1/2022 | Farag | H04W 76/14 |
| 2022/0132575 | A1 * | 4/2022 | Wu | H04W 74/0825 |
| 2022/0167311 | A1 * | 5/2022 | Xue | H04W 72/02 |
| 2022/0167415 | A1 * | 5/2022 | Uziel | H04W 72/20 |
| 2022/0201654 | A1 * | 6/2022 | Lee | H04L 5/0053 |
| 2022/0201667 | A1 * | 6/2022 | Wang | H04W 74/0816 |
| 2022/0232427 | A1 * | 7/2022 | Nguyen | H04L 5/0007 |
| 2022/0232519 | A1 * | 7/2022 | Nguyen | H04W 72/542 |
| 2022/0232626 | A1 * | 7/2022 | Li | H04W 72/02 |
| 2022/0303952 | A1 * | 9/2022 | Hoang | H04L 5/0005 |
| 2022/0322295 | A1 * | 10/2022 | Nguyen | H04W 72/02 |
| 2023/0081131 | A1 * | 3/2023 | Selvanesan | H04W 72/20<br>370/329 |
| 2023/0131345 | A1 * | 4/2023 | Lin | H04L 1/1812<br>370/329 |
| 2023/0362739 | A1 * | 11/2023 | Zhao | H04W 72/25 |
| 2024/0073907 | A1 * | 2/2024 | Hu | H04W 72/21 |
| 2024/0155569 | A1 * | 5/2024 | Ansari | H04W 72/51 |
| 2024/0155666 | A1 * | 5/2024 | Khoryaev | H04W 4/46 |

OTHER PUBLICATIONS

Moderator (LG Electronics): "Feature Lead Summary for AI 8.11. 1.2 Inter-UE Coordination for Mode 2 Enhancements", 3GPP TSG RAN WG 1#104bis-e, R1-2104103, e-Meeting, Apr. 12-20, 2021, Apr. 20, 2021 (Apr. 20, 2021) the whole document, pp. 1-75, pp. 1, 8, 59, 60.

Qualcomm Incorporated: "Reliability and Latency Enhancements for Mode 2", 3GPP TSG RAN WG1 Meeting #104bis-e, R1-2103185, Agenda Item 8.11.1.2, Apr. 12-20, 2021, Apr. 20, 2021, Sections 1-4, pp. 1-17.

Qualcomm Incorporated: "Reliability and Latency Enhancements for Mode 2", 3GPP Draft, R1-2006829, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1. No. Aug. 17, 2020-Aug. 28, 2020, Aug. 8, 2020 (Aug. 8, 2020), XP051918279, 10 Pages, section 3, p. 3-p. 5, section 4, p. 5-p. 6, the Whole Document, sections 1, 3, Section 7.

Qualcomm Incorporated: "Reliability and Latency Enhancements for Mode 2", 3GPP Draft, R1-2101486, 3GPP TSG RAN WG1 Meeting #104-e , 3rd Generation Partnership Project (3GPP), Mobile Competence Centre, 650, Route Des Lucioles, F-06921 Sophia-Antipolis Cedex, France, vol. RAN WG1. No. Jan. 25, 2021-Feb. 5, 2021, Jan. 19, 2021 (Jan. 19, 2021), XP051971651, 23 Pages, the whole document, sections 1-3.

Qualcomm Incorporated: "Reliability and Latency Enhancements for Mode 2", 3GPP TSG RAN WG1 Meeting #103-e, R1-2009273, 3rd Generation Partnership Project, Mobile Competence Centre, 650, Route Des Lucioles, F-06921 Sophia-Antipolis Cedex, France, vol. RAN WG1, No. e-meeting, Oct. 26, 2020-Nov. 13, 2020, Oct. 24, 2020, XP051946936, 19 Pages.

Qualcomm Incorporated: "Reliability and Latency Enhancements for Mode 2", 3GPP TSG RAN WG1 Meeting #104-e, R1-2101910, 3GPP, Mobile Competence Centre, 650, Route Des Lucioles, F-06921 Sophia-Antipolis Cedex, France, vol. RAN WG1, No. Jan. 25, 2021-Feb. 5, 2021, 23 Pages, Jan. 29, 2021, XP051975989.

Fraunhofer HHI, et al., "Resource Allocation Enhancements for Mode 2", 3GPP TSG RAN WG1 Meeting #104-e, R1-2100702, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, 13 Pages, XP051970475, section 2, section 3.

Moderator (LG Electronics): "Feature Lead Summary for AI 8.11. 2.2 Feasibility and Benefits for Mode 2 Enhancements", #3GPP TSG RAN WG1 #103-e, R1-2009788, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 19, 2020, pp. 1-79, XP051955958, section 1.1, section 1.2, section 1.5, section 3.1.

Supplementary European Search Report—EP21941058—Search Authority—The Hague—Dec. 2, 2024.

* cited by examiner

400

425

450

PRE-COLLISION SIGNALING ON INTER-UE COORDINATION RESOURCES

CROSS-REFERENCE TO RELATED APPLICATION

This application is a 35 U.S.C. § 371 National Phase of International Patent Application No. PCT/CN2021/092397, titled "PRE-COLLISION SIGNALING ON INTER-UE COORDINATION RESOURCES", filed on May 8, 2021, which is incorporated herein by reference in its entirety.

BACKGROUND

Technical Field

The present disclosure relates generally to communication systems, and more particularly, to apparatuses and methods of resolving pre-collision signaling on inter-UE coordination resources in sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include decoding, at a first user equipment (UE), sidelink control information (SCI) transmitted by a plurality of second UEs reserving a set of resources for sidelink transmission to the first UE. The method may also include detecting, at the first UE, a potential resource collision between the plurality of second UEs at the set of resources based on decoding of the SCI. The method may further include generating a pre-collision message that identifies the set of resources that are susceptible to the resource collision. The method may further include transmitting the pre-collision message from the first UE to the plurality of second UEs.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
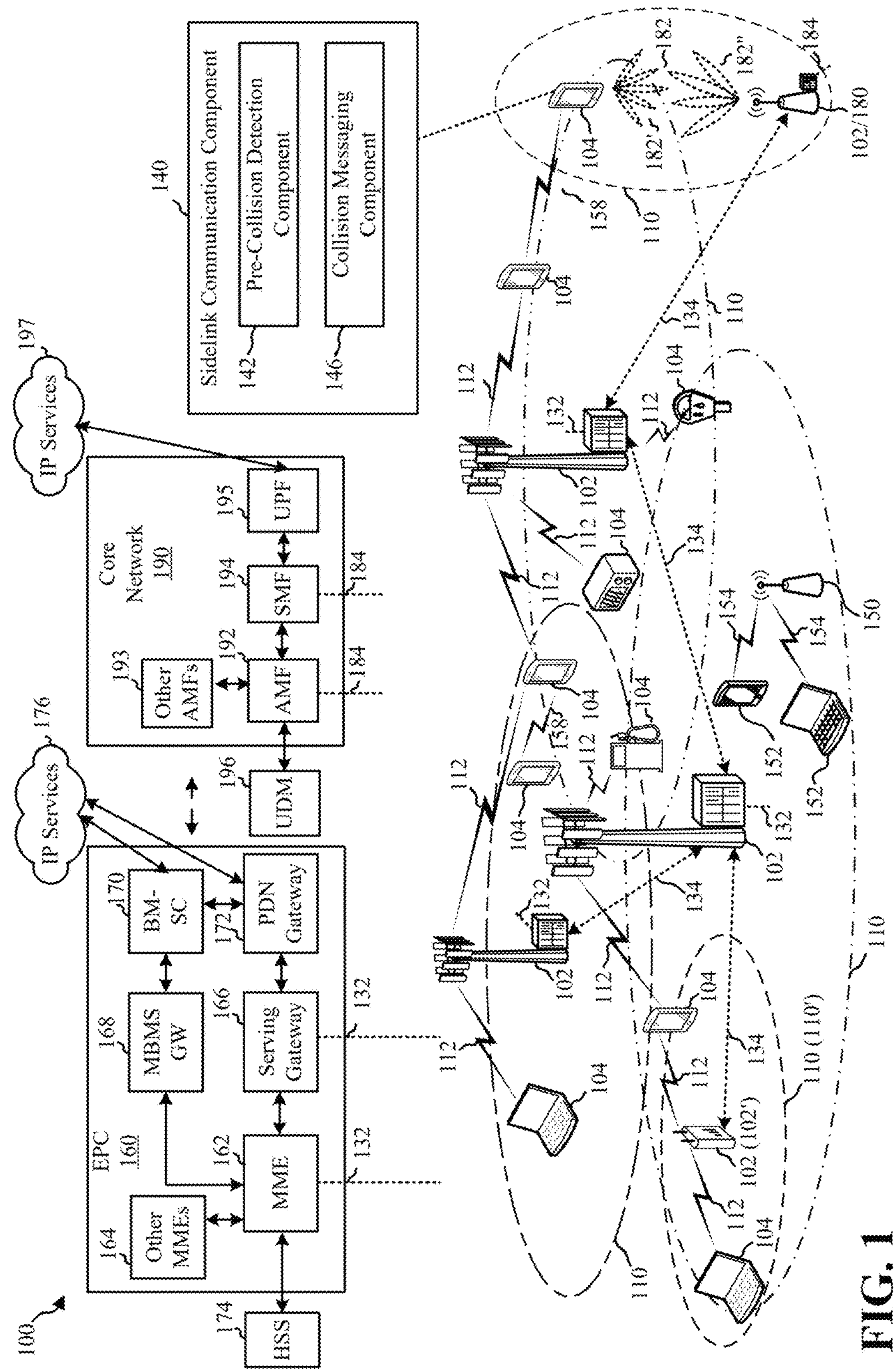
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) may communicate with another wireless communication device via a sidelink, which may also be referred to as direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

In order to implement sidelink communication between two or more UEs, a UE may be configured with either "mode 1" or "mode 2" sidelink scheduling. For mode 1 sidelink scheduling, a base station (e.g., gNB) may be responsible for scheduling sidelink transmissions between UEs. To this end, the base station may transmit a grant (e.g., downlink control information (DCI)) on a physical downlink control channel (PDCCH) to a transmitting UE and/or the receiving UE. In turn, the transmitting UE may transmit a sidelink control information (SCI) on a physical sidelink control channel (PSCCH) to provide additional information about the transmission.

A UE may also be configured for mode 2 sidelink scheduling in which the base station (e.g., gNB) may configure PSCCH/PSSCH occasions on which the UE is to monitor a PSCCH for a sidelink grant from a second UE for receiving the PSSCH. The PSSCH/PSSCH occasions may define time-domain and frequency-domain resources on which the PSCCH and the PSSCH may be received when the UE is configured for mode 2 sidelink scheduling. The time-domain resources may be defined as a number of slots or number of symbols. The frequency-domain resources may be defined as a number of sub-carriers. Similarly, a second UE may be configured with transmission resources corresponding to the PSCCH/PSSCH occasions. When the second UE has data to transmit to the first UE, the second UE may autonomously schedule a sidelink transmission by transmitting a SCI on the PSCCH/PSSCH occasions. Such coordination in mode 2 sidelink scheduling may be referred to as "inter-UE coordination" as the UEs autonomously schedule sidelink transmissions.

With respect to mode 2 sidelink scheduling (inter-UE coordination), there may be three types of coordination: Type A, Type B, and Type C. Under Type A, a first UE (e.g., UE-A) may send to a second UE (e.g., UE-B) a set of resource preferred for transmission by the second UE (e.g., UE-B) based on channel sensing results at the first UE (e.g., UE-A). For Type B, the first UE (e.g., UE-A) may send to second UE (e.g., UE-B) the set of resources that are not preferred for the transmission by the second UE (e.g., UE-B) based on channel sensing results or expected/potential resource conflicts. Under Type C, a first UE (e.g., UE-A) may send to second UE (e.g., UE-B), the set of resources where the resource conflict that may be detected by the first UE (e.g., UE-A) in order to preempt the second UE transmitting sidelink traffic to the first UE on one or more resources that may be occupied by a third UE.

As part of the inter-UE coordination, a first UE (e.g., UE-A) may detect and transmit one or more of channel sensing, resource sensing, or conflict information to a second UE (e.g., UE-B) in order to allow the second UE to prevent resource conflicts (pre-collision indications) or in some instances allow the second UE to retransmit the sidelink traffic once the resource conflict has already occurred. Thus, in some aspects, there may be potential collisions on resources that may necessitate changing of resources for sidelink communication (see FIG. 4, 400), post-collisions (see FIG. 4, 425) that allows the second UE to retransmit after a collision has occurred (e.g., after the first UE detects that there has been resource collision during the transmission of sidelink traffic by the second UE), or half-duplex collisions that allows second UE to also retransmit after a conflict has occurred where although frequency resources used for transmission by first UE and the second UE may be different (see FIG. 4, 450), the two UEs may contemptuously transmit during the same time slot. Thus, in absence of full-duplex capability by one of the UEs, the sidelink transmissions during the same time slot may prevent the UEs from receiving sidelink traffic, thereby causing a resource conflict).

Figure 5:
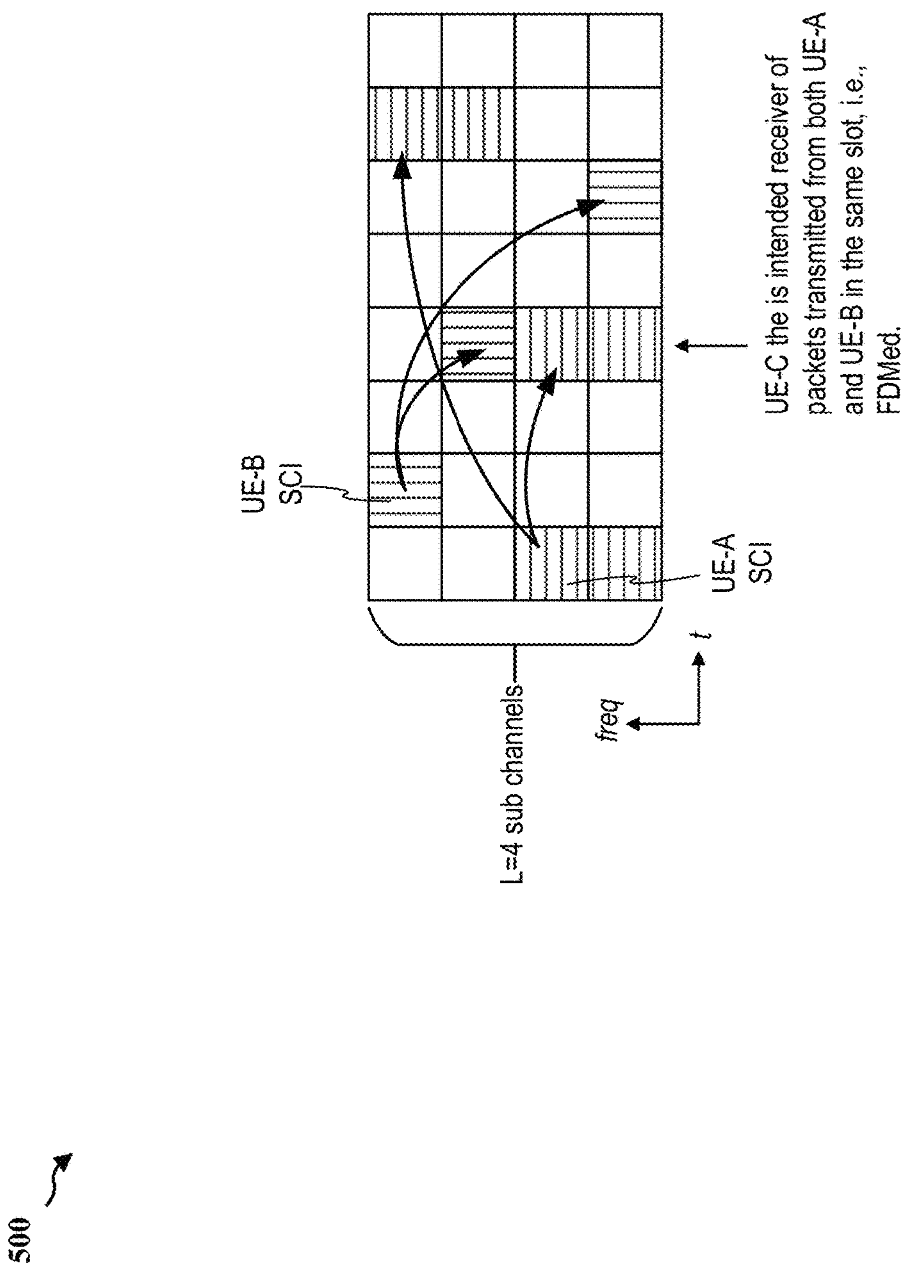
FIG. 5 is physical channel diagram of an example of inter-band leakage (IBE) that may occur when two or more UEs schedule transmission of sidelink traffic in adjacent frequencies during overlapping time slots in accordance with aspects of the present disclosure.

Another instance of resource collision may occur when two or more UEs use adjacent frequencies during the same time slot (see FIG. 5). Therefore, there may be situations when a first UE (e.g., UE-A) may be scheduled to receive sidelink traffic from a second UE (e.g., UE-B) and a third UE (e.g., UE-C) during the same time slot but in adjacent or proximate frequencies. In other words, the second and third UEs may schedule transmission during the same time slot, but in different resource blocks. Thus, while there is no resource "conflict" per se as the two transmitting UEs (e.g., UE-B and UE-C) schedule different frequencies, the proximity of the transmission between two signals may nonetheless result in inter-band leakage (IBE).

The above-identified issues of IBE may arise when the distance between the first UE (e.g., UE-A) and the second UE (e.g., UE-B) may be less than the distance between the first UE (e.g., UE-A) and one or more third UEs (e.g., UE-C). See e.g., FIG. 6. In such instance, the signal strength (e.g., Reference Signal Received Power (RSRP)) reception at the first UE (e.g., UE-A) for transmission from the second UE (e.g., UE-B) may be greater (see FIG. 6, 605) than the signal strength of transmission from the third UE (e.g., UE-C) to the first UE (see FIG. 6, 610). As a result of the difference between the signal strengths of the two transmissions on adjacent (or proximate) frequencies during the same time slot, the first UE may not be able to accurately detect or decode the second signal from the third UE (e.g., UE-C). Therefore, such scenario may also be considered as a resource conflict or collision as it impedes the ability of the first UE to receive and decode sidelink data on a set of resources.

In order to resolve the above-instances of resource collision, aspects of the present disclosure allow the UE that is scheduled to receive sidelink traffic to detect potential collisions or IBE issues (e.g., via decoding of sidelink control information (SCI) transmitted by one or more second UEs). Based on the detection of resource collision and/or IBE, the UE may transmit a pre-collision indication (e.g., prior in time to the scheduled resource conflict) to one or more second UEs scheduled to transmit sidelink traffic (e.g., UE-B and UE-C in above example) in order to allow the one or more second UEs to reselect resources for sidelink traffic.

In one example, the UE may send explicit pre-collision indication by sharing the same resource set as other inter-coordination messages (e.g., SCI-2, PFFCH, MAC CE, RRC, etc.). In other examples, the pre-collision indication (or signaling) may use orthogonal resource set with other inter-coordination messages. The orthogonal resource set may also be orthogonal to normal data transmissions. Such implementation may have advantage of preventing collisions of the pre-collision signaling with the transmitted data, but suffer from less resource selection options. Alternatively, the pre-collisions signaling may share the same resource set as normal data transmission. In such instance, while the UE may have more resources to select from for transmission of pre-collision indication, use of same resource set as data transmission may also risk colliding having the pre-collision indication collide with the data transmission.

Thus, in some examples, the one or more UEs may decide to send explicit pre-collision signaling when the RSRP measured on the reservation by transmitter UE-B is smaller than a threshold. In some examples, the threshold may be configured or signaled per transport blocks (TB). The pre-collision may also be based on IBE leakage criteria. For example, if the UE intends to receive sidelink traffic on reservation A, a collision may be detected if the signal-to-interference ratio (SIR) is lower than T2<<T1 and A and B overlap in just time (e.g., in adjacent frequencies). Additionally or alternatively, if UE intends to receive sidelink traffic on reservation A, a collision may be detected if SIR is lower than T4>>T3 and A and B overlap in just time (e.g., in adjacent frequencies).

Additionally, in some situations, a plurality of UEs may decode the SCIs transmitted by one or more second UEs. In such instance, the plurality of UEs may also detect and identify potential pre-collision instances for sidelink traffic based on decoding of the SCIs. However, having each of the plurality of UEs transmitting pre-collision indications may not be constructive use of the bandwidth and resources. As such, features of the present disclosure also provide techniques to limit the number of UEs that may transmit the pre-collision indications. In one example, the UEs that may transmit the pre-collision indication may be determined based on RSRP or distance satisfying a threshold interval. As noted above, the thresholds may be configured or signaled per TB from the second UE (e.g., UE-B). The threshold may also be calculated and decided by first UE (e.g., UE-A) based on a mapping function. In other instances, the threshold to determine if the UE should transmit a pre-collision indication may be derived from communication group size. For group cast (GC) option 1 (e.g., connectionless signaling), the UEs may utilize the zone information from incoming messages (including inter UE coordination messages) in order to estimate the number of other UEs within the communication range. Additionally, the combination of distance and RSRP thresholds may be used in conjunction. For example, if distance is less than 60 meters and the RSRP is less than −70 dBm, only UEs that are in non-line of sight (NLOS) or experiencing blockage condition may send pre-collision messages.

In another instance, there may be a deadline imposed to deliver pre-collision messages (e.g., b slots before the reservation resource transmission occasion). In such instance, b may be the UE processing time for receiving and detecting the collision signaling and to re-select resources and re-code the messages. Thus, each UE that is configured to transmit the pre-collision indication may randomly choose an available resource between the time of pre-collision detection until expiration of the delivery time period (e.g., deadline). However, during the waiting period before transmission of the pre-collision indication, the UE detects that another UE has also sent a pre-collision indication, the UE awaiting transmission of the pre-collision indication may cancel its own transmission. In such instance, the transmitter behavior may be adjusted by identifying a minimum timing gap to maximize the time required for the sidelink transmission UE to detect the pre-collision indication and reselect appropriate resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink communication component 140 configured to receive sidelink communications. The sidelink reception component 140 may include a pre-collision detection component 142 configured to decode SCI messages transmitted by one or more second UEs and determine whether there is a potential resource collision for reserved resources during which the one or more second UEs intend to transmit a sidelink packet to the first UE 104. Based on detection of possible collision, the collision messaging component 146 may generate a pre-collision indication (or signal/message) to alert the one or more second UEs of the potential collision and allow the second UEs to reselect resources that would not conflict with other sidelink transmissions.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “Sub-6 GHZ” band in various documents and articles. A similar nomenclature issue sometimes occurs with regard to FR2, which is often referred to (interchangeably) as a “millimeter wave” (mmW) band in documents and articles, despite being different from the extremely high frequency (EHF)

band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
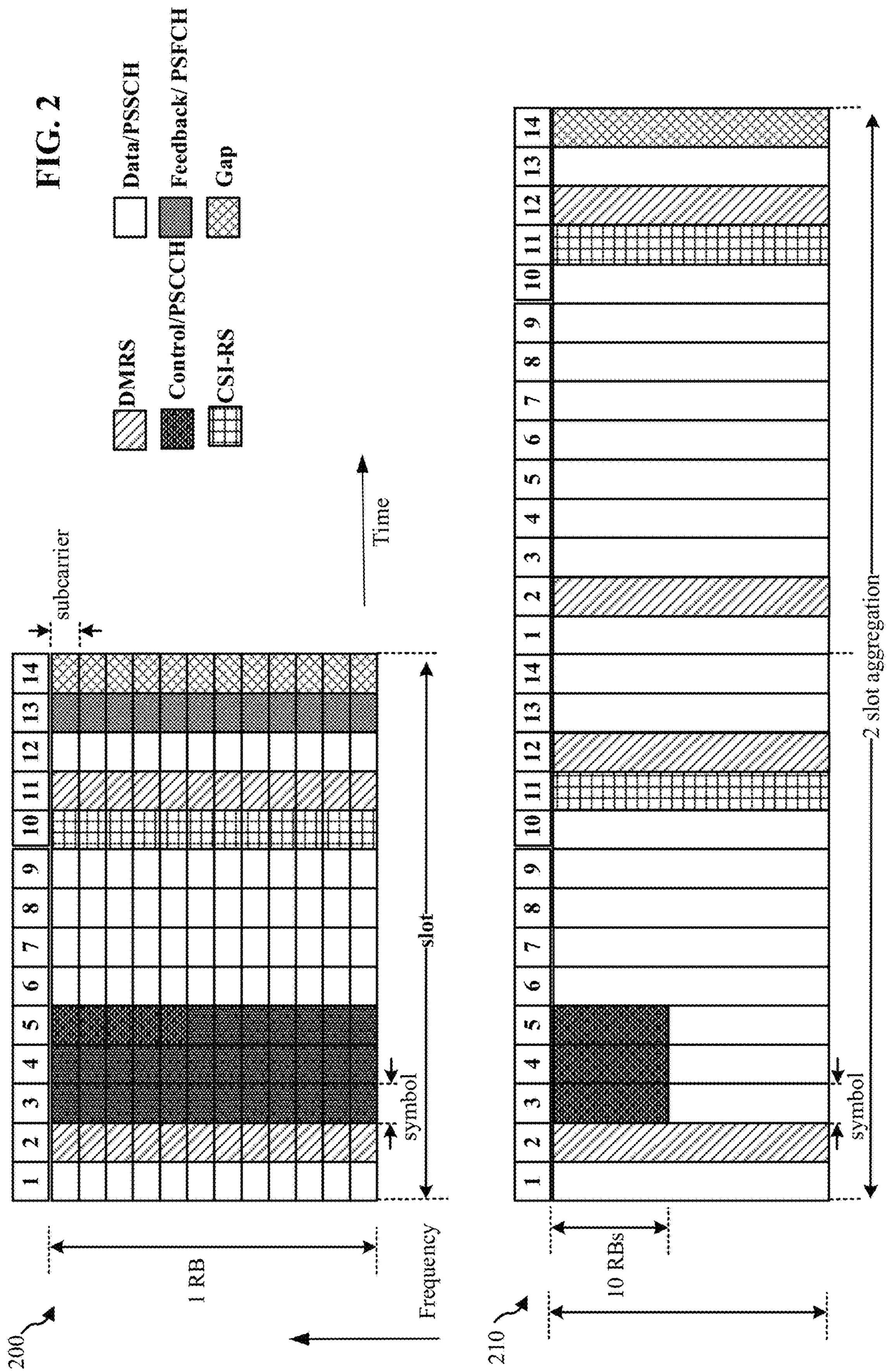
FIG. 2 illustrates an example of a sidelink slot structure in accordance with various aspects of the present disclosure.

FIG. 2 illustrates example diagrams 200 and 210 illustrating examples slot structures that may be used for wireless communication between UE 104 and UE 104', e.g., for sidelink communication. The slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., a physical sidelink control channel (PSCCH) along with demodulation RS (DMRS). The control information may include Sidelink Control Information (SCI). The SCI may reserve resources for data, e.g., a physical sidelink shared channel (PSSCH). In NR, PSCCH and PSSCH may be time domain multiplexed. As illustrated in diagram 210, multiple slots may be aggregated together.

For example, diagram 210 shows aggregation of two slots. The aggregated number of slots may also be larger than two.

An example of sidelink communication may include cellular vehicle to everything (CV2X) applications. To receive sidelink packets, the receiver (RX) may perform blind decoding in some or all sub-channels. The number of sub-channels may range from, e.g., 1-27 channels. PSCCH and PSSCH may be transmitted within a same slot. PSSCH may occupy up to $$N^{SL}_{subchannel}$$

contiguous sub-channels. PSCCH may occupy one sub-channel with the lowest sub-channel index. The first-stage SCI (SCI-1) may be transmitted in PSCCH containing information about PSSCH bandwidth and resource reservation in future slots. The second-stage SCI (SCI-2) may be found and decoded after decoding PSCCH. The source identification (ID) and/or destination ID may be used to identify the transmitting UE and the receiving UE of the packet, respectively. The size of the sub-channels in vehicle to everything (V2X) may be 10 or more resource blocks (RBs). In CV2X, the UEs may decode all transmissions and blind decode all sub-channels.

In some instances of industrial internet of things (IOT), sidelink may enable direct programmable logical controller and sensor/actuator communications. A wireless PLC may be flexible and allow for simple deployment. Each PLC may control a number of SAs, such as 20-50 SAs as an example. Such a scheme may satisfy a tight latency (e.g., 1-2 milliseconds (ms)) and ultra-reliability requirement (e.g., 10-6 error rate). Communication through one or more BSs may require multiple over the air (OTAs) transmissions, which may negatively impact latency and/or reliability.

Some example traffic characteristics of industrial IoT may be as follows: IoT traffic may typically be deterministic and/or with small packet size (e.g., 32-256 bytes). Since the required bandwidth is low, 2 RBs may be sufficient in some cases. The SAs may have constraints on UE capabilities in terms of bandwidth and processing power. The overall bandwidth may be large (e.g., 100 Megahertz or above) for IOT with dedicated frequency bands and/or unlicensed bands. The SAs may not need to detect and/or monitor all transmissions. PSCCH may be required to meet stringent IoT requirements. The radio frequency (RF) environment may include blockage and/or interference.

Figure 3:
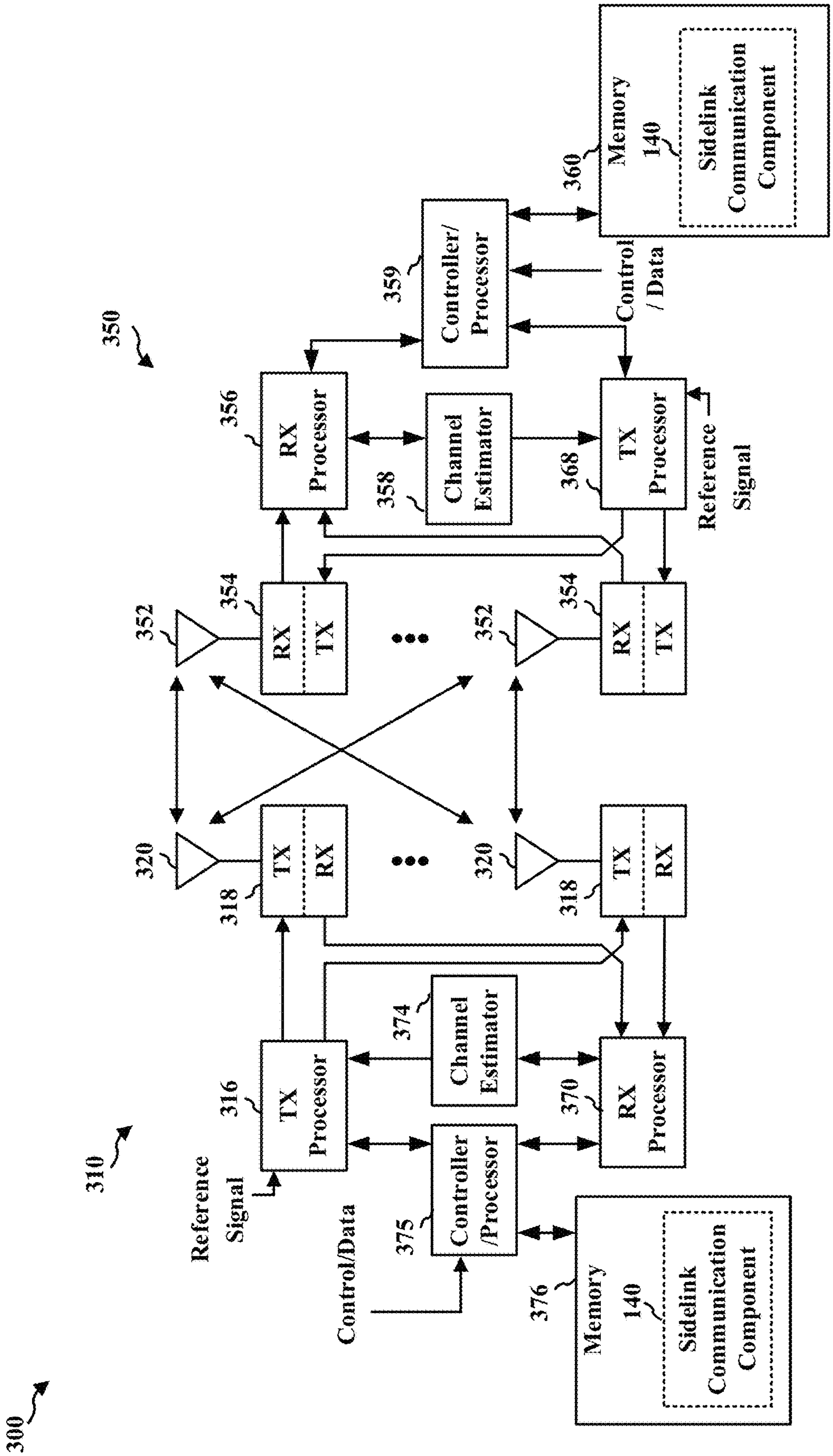
FIG. 3 is a diagram illustrating an example of a user equipment (UE) in communication with the second UE for sidelink communication in accordance with various aspects of the present disclosure.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink communication component 140 of FIG. 1.

At least one of the TX processor 316, the RX processor 370, and the controller/processor 375 may be configured to perform aspects in connection with the sidelink scheduling component 120 of FIG. 1.

Figure 4:
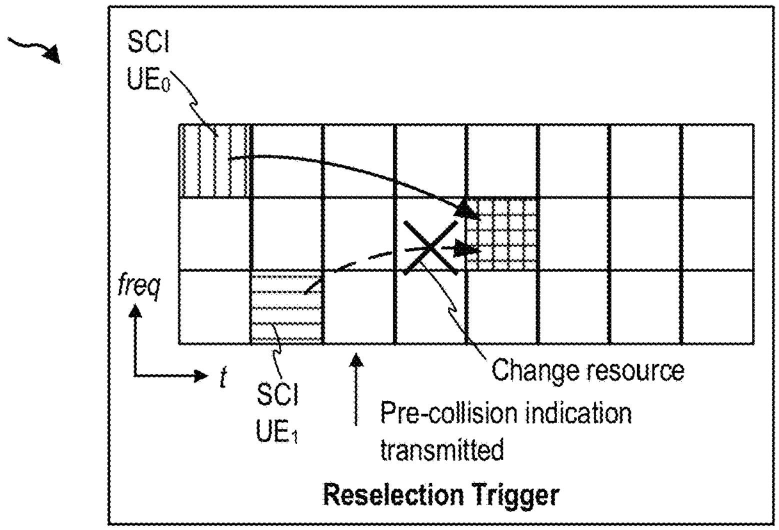
FIG. 4 is a diagram of an example of pre- and post-collision resource selection in accordance with various aspects of the present disclosure.
Figure 4:
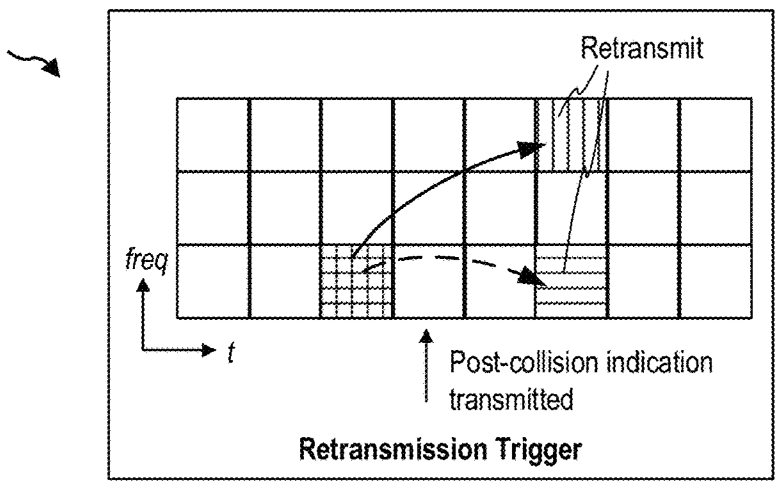
Figure 4:
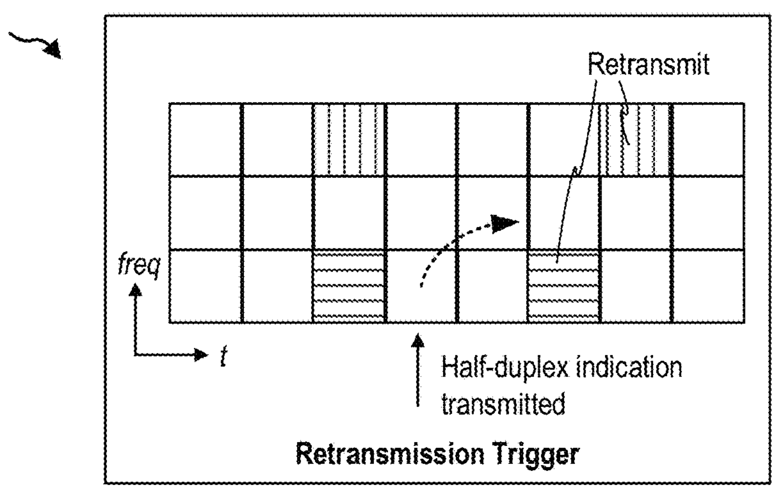

FIG. 4 are examples of scheduling reservations triggering pre- and post-collision of reserved resources for sidelink communication. As discussed above, in accordance with inter-UE coordination, a first UE (e.g., UE-A) may detect and transmit one or more of channel sensing, resource sensing, or conflict information to a second UE (e.g., UE-B) in order to allow the second UE to prevent resource conflicts (pre-collision indications) or in some instances allow the second UE to retransmit the sidelink traffic once the resource conflict has already occurred.

In some aspects, there may be potential collisions for traffic on resources that may necessitate reselecting or changing resources for sidelink communication (e.g., diagram 400). In other instances, the UE may detect collisions after-the-fact (e.g., diagram 425) that allows the second UE to retransmit after a collision has occurred (e.g., after the first UE detects that there has been resource collision during the transmission of sidelink traffic by the second UE). In yet another example, the UE may detect half-duplex collisions (e.g., diagram 450) that allows second UE to also retransmit after a conflict has occurred where although frequency resources used for transmission by first UE and the second UE may be different, the two UEs may contemptuously transmit during the same time slot. Thus, in absence of full-duplex capability by one of the UEs, the sidelink transmissions during the same time slot may prevent the UEs from receiving sidelink traffic, thereby causing a resource conflict).

FIG. 5 is a diagram 500 of an example of IBE that may occur when two or more UEs schedule transmission of sidelink traffic in adjacent frequencies during overlapping time slots. Therefore, there may be situations when a first UE (e.g., UE-A) may be scheduled to receive sidelink traffic from a second UE (e.g., UE-B) and a third UE (e.g., UE-C) during the same time slot but in adjacent or proximate frequencies. In other words, the second and third UEs may schedule transmission during the same time slot, but in different resource blocks. Thus, while there is no resource “conflict” per se as the two transmitting UEs (e.g., UE-B and UE-C) schedule different frequencies, the proximity of the transmission between two signals may nonetheless result in inter-band leakage (IBE).

The above-identified issues of IBE may arise when the distance between the first UE (e.g., UE-A) and the second UE (e.g., UE-B) may be less than the distance between the first UE (e.g., UE-A) and one or more third UEs (e.g., UE-C).

Figure 6:
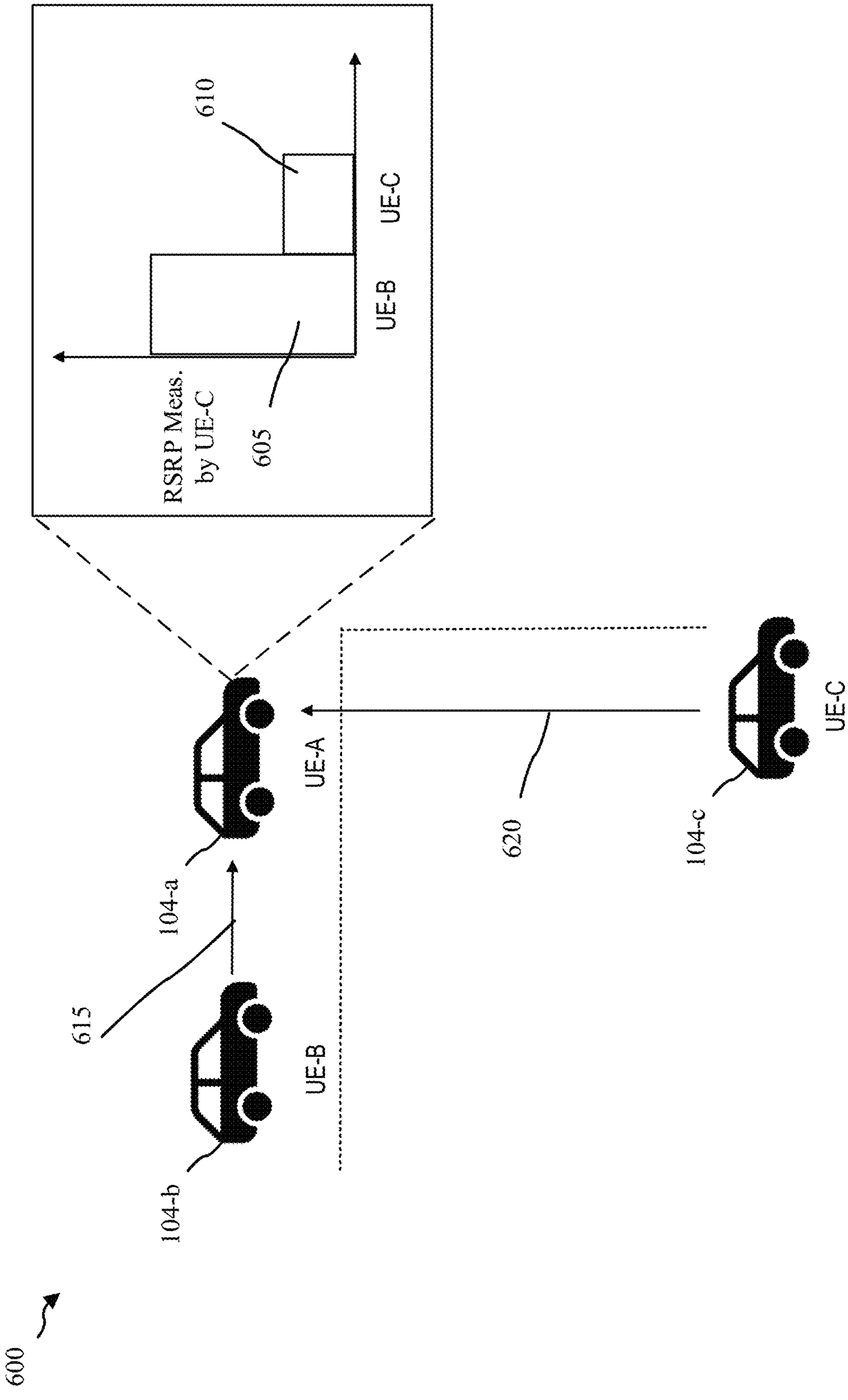
FIG. 6 is diagram of a situation where the distance of one or more UEs may impact the IBE based on the detected signal strength in accordance with aspects of the present disclosure.

For example, FIG. 6 is diagram 600 of a situation where the distance of one or more UEs may impact the IBE based on the detected signal strength. Specifically, in some examples, the RSRP 605 at the first UE 104-*a* (e.g., UE-A) for first transmission 615 from the second UE 104-*b* (e.g., UE-B) may be greater than the RSRP 610 of second transmission 620 from the third UE 104-*c* (e.g., UE-C) to the first UE 104-*a*. As a result of the difference between the signal strengths (605, 610) of the first transmissions 615 and the second transmission 620 on adjacent (or proximate) frequencies during the same time slot, the first UE 104-*a* may not be able to accurately detect or decode the second transmission 620 from the third UE 104-*c* (e.g., UE-C). Therefore, such scenario may also be considered as a resource conflict or collision as it impedes the ability of the first UE to receive and decode sidelink data on a set of resources.

Figure 7:
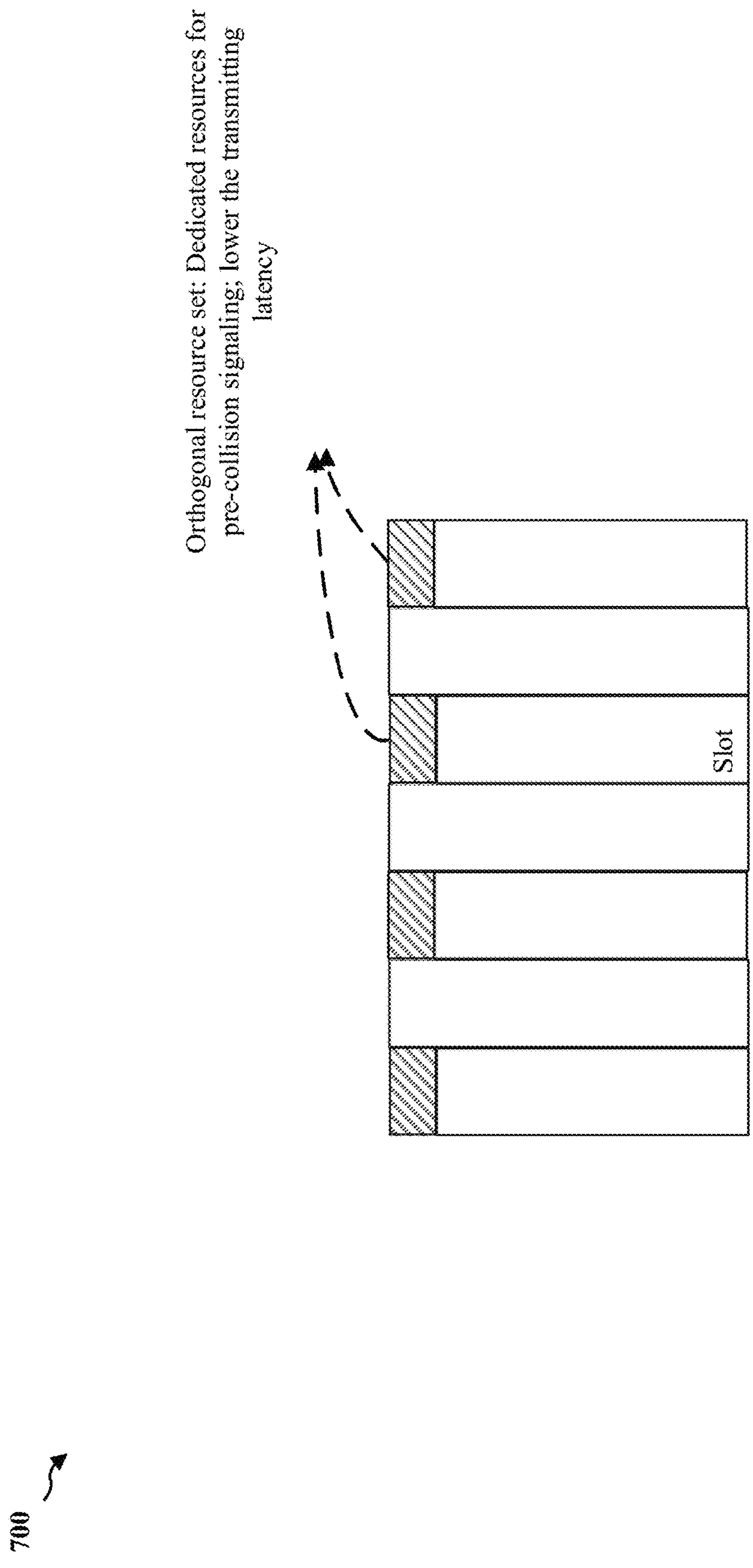
FIG. 7 is a diagram of resource selection for transmission of pre-collision message to alert one or more second UEs of the potential resource collision in accordance with aspects of the present disclosure.

FIG. 7 is a diagram 700 of resource selection for transmission of pre-collision message to alert one or more second UEs (e.g., 104-*b* and/or 104-*c*) of the potential resource collision. Specifically, in order to resolve the above-instances of resource collision, aspects of the present disclosure allow the UE (e.g., first UE 104-*a*) that is scheduled to receive sidelink traffic to detect potential collisions or IBE issues (e.g., via decoding of SCI transmitted by one or more second UEs). Based on the detection of resource collision and/or IBE, the first UE 104-*a* may transmit a pre-collision indication (e.g., prior in time to the scheduled resource conflict) to one or more second UEs (e.g., UE-b 104-*b* and/or UE-c 104-*c*) scheduled to transmit sidelink traffic such that the one or more second UEs (e.g., UE-b 104-*b* and/or UE-c 104-*c*) may reselect resources for sidelink traffic and preemptively avoid resource collision.

In one example, the UE may send explicit pre-collision indication by sharing the same resource set as other inter-coordination messages (e.g., SCI-2, PFFCH, MAC CE, RRC, etc.). In other examples, the pre-collision indication (or signaling) may use orthogonal resource set with other inter-coordination messages. The orthogonal resource set may also be orthogonal to normal data transmissions. Such implementation may have advantage of preventing collisions of the pre-collision signaling with the transmitted data, but suffer from less resource selection options. Alternatively, the pre-collisions signaling may share the same resource set as normal data transmission. In such instance, while the UE may have more resources to select from for transmission of pre-collision indication, use of same resource set as data transmission may also risk colliding having the pre-collision indication collide with the data transmission.

Thus, in some examples, the one or more UEs may decide to send explicit pre-collision signaling when the RSRP measured on the reservation by transmitter UE-B is smaller than a threshold. In some examples, the threshold may be configured or signaled per transport blocks (TB). The pre-collision may also be based on IBE leakage criteria. For example, if the UE intends to receive sidelink traffic on reservation A, a collision may be detected if the signal-to-interference ratio (SIR) is lower than T2<<T1 and A and B overlap in just time (e.g., in adjacent frequencies). Additionally or alternatively, if UE intends to receive sidelink traffic on reservation A, a collision may be detected if SIR is lower than T4>>T3 and A and B overlap in just time (e.g., in adjacent frequencies). In some aspects, the SIR may be measured by taking the first RSRP of reservation A (e.g., signal from UE-B that has made reservation for a first set of resources) divided by the measured second RSRP on reservation B (e.g., signal from UE-C that has made reservation for a second set of resources in the same time slot). Thus, the SIR may represent the SIR ratio between the two signals.

Additionally, in some situations, a plurality of UEs may decode the SCIs transmitted by one or more second UEs. In such instance, the plurality of UEs may also detect and identify potential pre-collision instances for sidelink traffic based on decoding of the SCIs. However, having each of the plurality of UEs transmitting pre-collision indications may not be constructive use of the bandwidth and resources. As such, features of the present disclosure also provide techniques to limit the number of UEs that may transmit the pre-collision indications. In one example, the UEs that may transmit the pre-collision indication may be determined based on RSRP or distance satisfying a threshold interval. As noted above, the thresholds may be configured or signaled per TB from the second UE (e.g., UE-B). The threshold may also be calculated and decided by first UE (e.g., UE-A) based on a mapping function. In other instances, the threshold to determine if the UE should transmit a pre-collision indication may be derived from communication group size. For group cast (GC) option 1 (e.g., connectionless signaling), the UEs may utilize the zone information from incoming messages (including inter UE coordination messages) in order to estimate the number of other UEs within the communication range. Additionally, the combination of distance and RSRP thresholds may be used in conjunction. For example, if distance is less than 60 meters and the RSRP is less than −70 dBm, only UEs that are in non-line of sight (NLOS) or experiencing blockage condition may send pre-collision messages.

In another instance, there may be a deadline imposed to deliver pre-collision messages (e.g., b slots before the reservation resource transmission occasion). In such instance, b may be the UE processing time for receiving and detecting the collision signaling and to re-select resources and re-code the messages. Thus, each UE that is configured to transmit the pre-collision indication may randomly choose an available resource between the time of pre-collision detection until expiration of the delivery time period (e.g., deadline). However, during the waiting period before transmission of the pre-collision indication, the UE detects that another UE has also sent a pre-collision indication, the UE awaiting transmission of the pre-collision indication may cancel its own transmission. In such instance, the transmitter behavior may be adjusted by identifying a minimum timing gap to maximize the time required for the sidelink transmission UE to detect the pre-collision indication and reselect appropriate resources.

Figure 8:
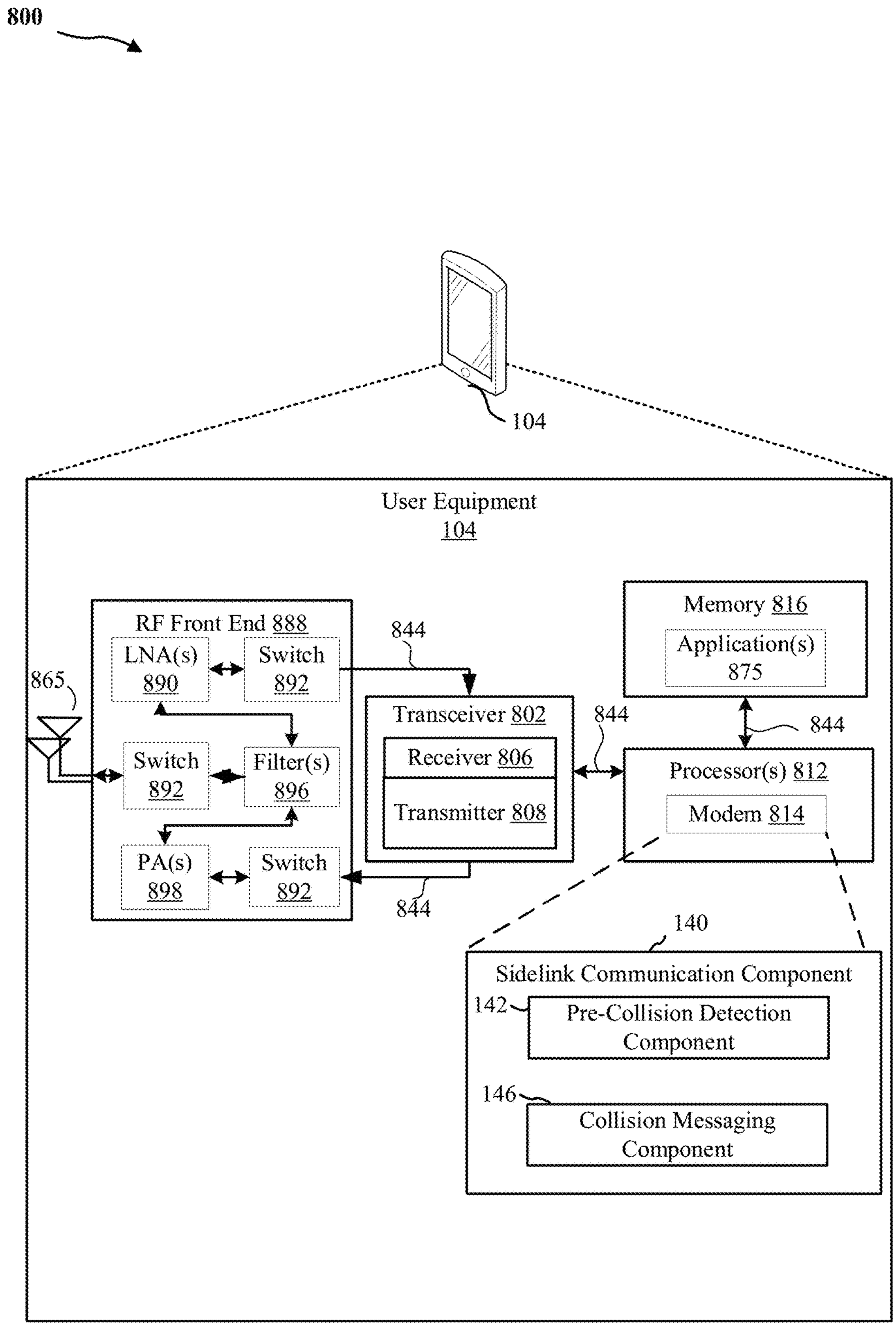
FIG. 8 is a schematic diagram of an example implementation of various components of a user equipment in accordance with various aspects of the present disclosure.

FIG. 8 illustrates a hardware components and subcomponents of a device that may be a UE 104 for implementing one or more methods (e.g., method 900) described herein in accordance with various aspects of the present disclosure. For example, one example of an implementation of the UE 104 may include a variety of components, some of which have already been described above, but including components such as one or more processors 812, memory 816 and transceiver 802 in communication via one or more buses 444, which may operate in conjunction with the sidelink communication component 140 to perform functions described herein related to including one or more methods (e.g., 900) of the present disclosure.

In an aspect, the sidelink reception component 140 may include a pre-collision detection component 142 configured to decode SCI messages transmitted by one or more second UEs and determine whether there is a potential resource collision for reserved resources during which the one or more second UEs intend to transmit a sidelink packet to the first UE 104. Based on detection of possible collision, the collision messaging component 146 may generate a pre-collision indication (or signal/message) to alert the one or more second UEs of the potential collision and allow the second UEs to reselect resources that would not conflict with other sidelink transmissions.

The one or more processors 812, modem 814, memory 816, transceiver 802, RF front end 888 and one or more antennas 865, may be configured to support voice and/or data calls (simultaneously or non-simultaneously) in one or more radio access technologies. In an aspect, the one or more processors 812 can include a modem 814 that uses one or more modem processors. The various functions related to sidelink reception component 140 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with sidelink reception component 140 may be performed by transceiver 802.

The memory 816 may be configured to store data used herein and/or local versions of application(s) 875 or sidelink reception component 140 and/or one or more of its subcomponents being executed by at least one processor 812. The memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, the memory 816 may be a non-transitory computer-readable storage medium that stores one or more computer-executable codes defining sidelink reception component 140 and/or one or more of its subcomponents, and/or data associated therewith, when the UE 104 is operating at least one processor 812 to execute sidelink reception component 140 and/or one or more of its subcomponents.

The transceiver 802 may include at least one receiver 806 and at least one transmitter 808. The receiver 806 may include hardware, firmware, and/or software code executable by a processor for receiving data, the code comprising instructions and being stored in a memory (e.g., computer-readable medium). The receiver 806 may be, for example, a radio frequency (RF) receiver. In an aspect, the receiver 806 may receive signals transmitted by at least one UE 104. Additionally, receiver 806 may process such received signals, and also may obtain measurements of the signals, such as, but not limited to, Ec/Io, SNR, RSRP, RSSI, etc. The transmitter 808 may include hardware, firmware, and/or software code executable by a processor for transmitting data, the code comprising instructions and being stored in a memory (e.g., computer-readable medium). A suitable example of the transmitter 808 may including, but is not limited to, an RF transmitter.

Moreover, in an aspect, transmitting device may include the RF front end 888, which may operate in communication with one or more antennas 865 and transceiver 802 for receiving and transmitting radio transmissions, for example, wireless communications transmitted by at least one base station 102 or wireless transmissions transmitted by UE 104. The RF front end 888 may be connected to one or more antennas 865 and can include one or more low-noise amplifiers (LNAs) 890, one or more switches 892, one or more power amplifiers (PAS) 898, and one or more filters 896 for transmitting and receiving RF signals.

In an aspect, the LNA 890 can amplify a received signal at a desired output level. In an aspect, each LNA 890 may have a specified minimum and maximum gain values. In an aspect, the RF front end 888 may use one or more switches 892 to select a particular LNA 890 and its specified gain value based on a desired gain value for a particular application.

Further, for example, one or more PA(s) 898 may be used by the RF front end 888 to amplify a signal for an RF output at a desired output power level. In an aspect, each PA 898 may have specified minimum and maximum gain values. In an aspect, the RF front end 888 may use one or more switches 892 to select a particular PA 898 and its specified gain value based on a desired gain value for a particular application.

Also, for example, one or more filters 896 can be used by the RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, the RF front end 888 can use one or more switches 892 to select a transmit or receive path using a specified filter 896, LNA 890, and/or PA 898, based on a configuration as specified by the transceiver 802 and/or processor 812.

As such, the transceiver 802 may be configured to transmit and receive wireless signals through one or more antennas 865 via the RF front end 488. In an aspect, the transceiver 802 may be tuned to operate at specified frequencies such that transmitting device can communicate with, for example, one or more base stations 102 or one or more cells associated with one or more base stations 102 or other UEs 104. In an aspect, for example, the modem 814 can configure the transceiver 802 to operate at a specified frequency and power level based on the configuration of the transmitting device and the communication protocol used by the modem 814.

In an aspect, the modem 814 can be a multiband-multimode modem, which can process digital data and communicate with the transceiver 802 such that the digital data is sent and received using the transceiver 802. In an aspect, the modem 814 can be multiband and be configured to support multiple frequency bands for a specific communications protocol. In an aspect, the modem 814 can be multimode and be configured to support multiple operating networks and communications protocols. In an aspect, the modem 814 can control one or more components of transmitting device (e.g., RF front end 888, transceiver 802) to enable transmission and/or reception of signals from the network based on a specified modem configuration. In an aspect, the modem configuration can be based on the mode of the modem 814 and the frequency band in use. In another aspect, the modem configuration can be based on UE configuration information associated with transmitting device as provided by the network during cell selection and/or cell reselection.

Figure 9:
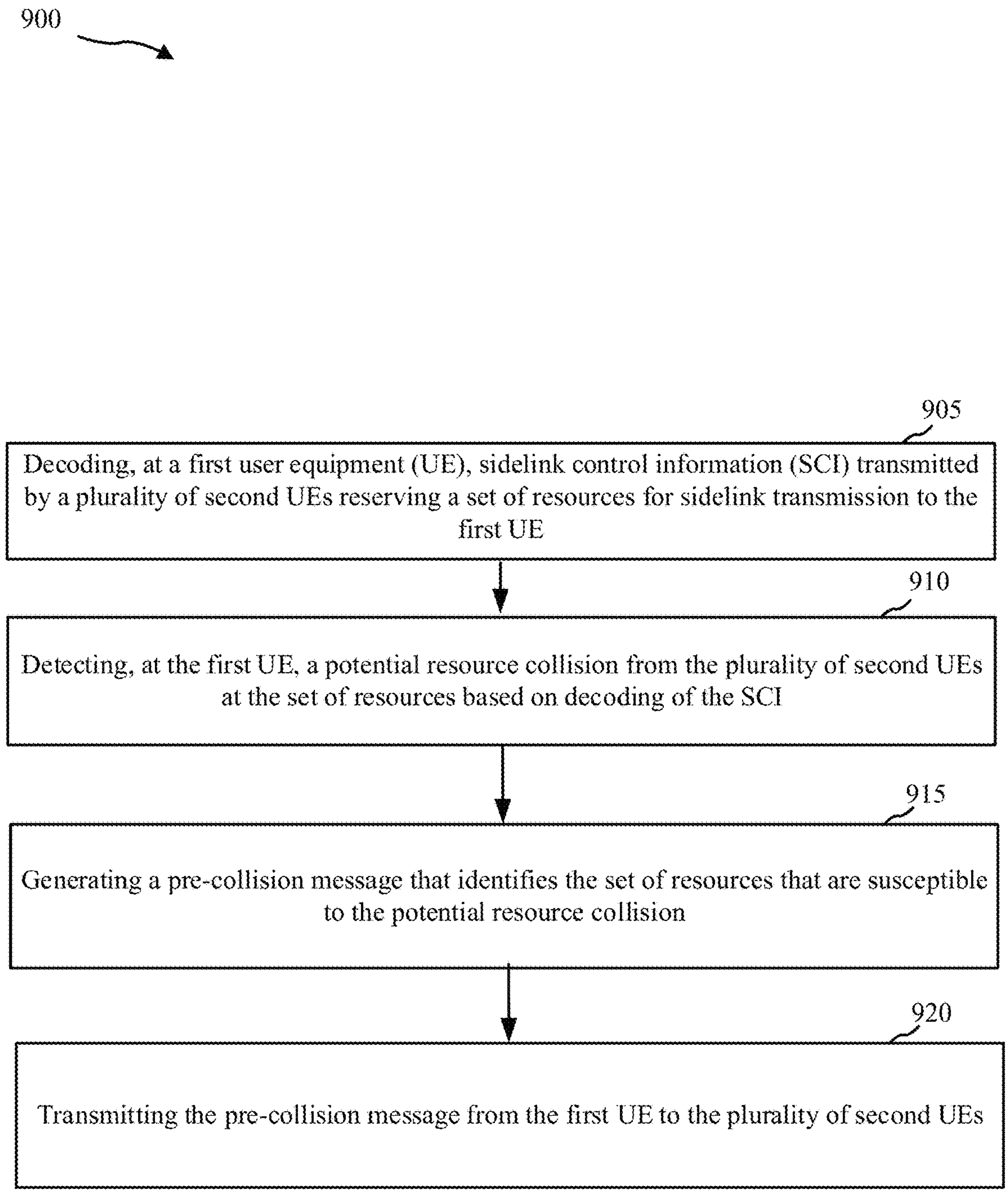
FIG. 9 is a flow diagram of an example of a method of wireless communication implemented by the UE in accordance with aspects of the present disclosure.

FIG. 9 is a flowchart of an example method 900 for operating a UE 104-*a* for sidelink reception. The method 900 may be performed by a UE 104. The method 900 may be performed by the sidelink communication component 140 in communication with the sidelink control component 198 of the base station 102 and the sidelink scheduling component 120 of another UE 104.

At block 905, the method 900 may include decoding, at a first user equipment (UE), sidelink control information (SCI) transmitted by a plurality of second UEs reserving a set of resources for sidelink transmission to the first UE. Aspects of block 905 may be performed by sidelink communication component 140. Specifically, the UE may detect transmission from at least one second UE 104 at one or more antennas 865. The packet may be forwarded to the transceiver 802 and subsequently to the sidelink communication component 140 of the modem 814. Portions of the resource blocks associated with the received transmission may include SCI that identifies resource reservation information from one or more second UEs (e.g., UE-B and/or UE-C) that may be targeting sending sidelink data to the first UE (e.g., UE-A). The sidelink communication component 140 may decode the SCI and identify the resources that the one or more second UEs reserved. Accordingly, the UE 104, the transceiver 802, and/or the controller/processor 812 executing the sidelink communication component 140 of the modem 814 may provide means for decoding, at a first UE, SCI transmitted by a plurality of second UEs reserving a set of resources for sidelink transmission to the first UE.

At block 910, the method 900 may include detecting, at the first UE, a potential resource collision between the plurality of second UEs at the set of resources based on decoding of the SCI. Aspects of block 910 may be performed by sidelink communication component 140 and the pre-collision detection component 142. Specifically, the pre-collision detection component 142 executing on the modem 814 may determine whether one or more second UEs are either transmitting on shared resources such that there is a potential for resource collision in the event the plurality of second UEs 104 transmit sidelink traffic during the reserved resources or whether the plurality of UEs are scheduled to transmit sidelink packets during the same time slot in adjacent frequencies. Thus, in some examples, detecting one of the potential resource collision or IBE includes detecting that the plurality of second UEs are scheduled for sidelink transmission over either overlapping resources or adjacent resources in a frequency domain such that there is a potential for IBE. Accordingly, the UE 104, the transceiver 802, and/or the controller/processor 812 executing the sidelink communication component 140 and pre-collision detection component 142 of the modem 814 may provide means for detecting, at the first UE, one of a potential resource collision or IBE between the plurality of second UEs at the set of resources based on decoding of the SCI.

In some aspects, detecting the one of the potential resource collision from the plurality of second UEs may comprise detecting that the plurality of second UEs are scheduled for sidelink transmission over either overlapping resources or adjacent resources in a frequency domain such that there is a potential for IBE. The method may also include measuring a reference signal received power (RSRP) for a signal between the first UE and at least one of the plurality of second UEs, and calculating that the RSRP measured for the signal between the first UE and at least one of the plurality of second UEs is less than a threshold. The method may also include identifying that at least two or more of the plurality of second UEs have reserved adjacent frequency resources in an overlapping time slot.

At block 915, the method 900 may include generating a pre-collision message that identifies the set of resources that are susceptible to the potential resource collision. Aspects of block 915 may be performed by collision messaging component 146 of the modem 814. The collision message component 146 may generate a pre-collision indication that includes information associated with channel sensing performed by the UE 104, the RSRP associated with the signals from the second UEs, and resource conflict information. Accordingly, the UE 104, the transceiver 802, and/or the controller/processor 812 executing the sidelink communication component 140 and collision messaging component 146 of the modem 814 may provide means for generating a pre-collision message that identifies the set of resources that are susceptible to the resource collision or the IBE in response to detecting the potential resource collision or the IBE between the plurality of second UEs.

At block 920, the method 900 may include transmitting the pre-collision message from the first UE to the plurality of second UEs. Aspects of block 920 may be performed by the transceiver 802 and the modem 814 of the UE 104. In some examples, the pre-collision message generated by the collision messaging component 146 of the modem may be routed to the transceiver 802 and to the one or more antennas 865 to the be wirelessly broadcasted to the one or more second UEs 104 in resources reserved for transmission of the pre-collision messages. Accordingly, the UE 104, transceiver 802, modem 814, one or more antennas 865, and the collision messaging component 146 of the modem may provide means for transmitting the pre-collision message from the first UE to the plurality of second UEs. In some aspects, transmitting the pre-collision message from the first UE to the plurality of second UEs may comprise transmitting the pre-collision message on a resource set reserved for inter-coordination messages. In other examples, transmitting the pre-collision message from the first UE to the plurality of second UEs may comprise transmitting the pre-collision message using orthogonal resource set with inter-coordination messages. In some examples, the orthogonal resource set is orthogonal to data transmission or share the same resource set as the data transmission.

In some examples, transmitting the pre-collision message from the first UE to the plurality of second UEs, may comprise measuring one or both of a reference signal received power (RSRP) or distance between the first UE and at least one of the plurality of second UEs, and calculating that one or both of the RSRP or the distance between the first UE and at least one of the plurality of second UEs is less than a threshold. The method may also include transmitting the pre-collision message from the first UE to the plurality of second UEs when the first UE is in non-line of sight (NLOS) of at least of the plurality of second UEs.

In other examples, transmitting the pre-collision message from the first UE to the plurality of second UEs may comprise selecting a resource for transmission of the pre-collision message and queuing the pre-collision message for transmission from the first UE to the plurality of second UEs. In some examples, the method may include monitoring a communication channel to determine whether another UE has transmitted a separate pre-collision message while the pre-collision message is queued for transmission. In some aspects, the method may also include transmitting the pre-collision message from the first UE to the plurality of second UEs prior to expiration of a time period based on determining that the another UE has not transmitted a separate pre-collision message on the communication channel identifying one of the potential resource collision or the IBE.

Some Further Example Clauses

Implementation examples are described in the following numbered clauses:

1. A method of wireless communication, comprising:
decoding, at a first user equipment (UE), sidelink control information (SCI) transmitted by a plurality of second UEs reserving a set of resources for sidelink transmission to the first UE;
detecting, at the first UE, a potential resource collision from the plurality of second UEs at the set of resources based on decoding of the SCI;
generating a pre-collision message that identifies the set of resources that are susceptible to the potential resource collision; and
transmitting the pre-collision message from the first UE to the plurality of second UEs.

2. The method of clause 1, wherein transmitting the pre-collision message from the first UE to the plurality of second UEs, comprises:
transmitting the pre-collision message on a resource set reserved for inter-coordination messages.

3. The method of any clause 1-2, wherein transmitting the pre-collision message from the first UE to the plurality of second UEs, comprises:
transmitting the pre-collision message using orthogonal resource set with inter-coordination messages.

4. The method of any clause 1-3, wherein the orthogonal resource set is orthogonal to data transmission or share the same resource set as the data transmission.

5. The method of any clause 1-4, wherein detecting the potential resource collision from the plurality of second UEs at the set of resources comprises:
detecting that the plurality of second UEs are scheduled for sidelink transmission over either overlapping resources or adjacent resources in a frequency domain such that there is a potential for inter-band leakage (IBE).

6 The method of any clause 1-5, wherein detecting the potential resource collision from the plurality of second UEs at the set of resources comprises:
measuring a reference signal received power (RSRP) for a signal between the first UE and at least one of the plurality of second UEs; and
calculating that the RSRP measured for the signal between the first UE and at least one of the plurality of second UEs is less than a threshold.

7. The method of any clause 1-6, further comprising:

identifying that at least two or more of the plurality of second UEs have reserved adjacent frequency resources in an overlapping time slot.

8. The method of any clause 1-7, wherein transmitting the pre-collision message from the first UE to the plurality of second UEs, comprises:

measuring one or both of a reference signal received power (RSRP) or distance between the first UE and at least one of the plurality of second UEs; and calculating that one or both of the RSRP or the distance between the first UE and at least one of the plurality of second UEs is less than a threshold.

9 The method of any clause 1-8, further comprising:

transmitting the pre-collision message from the first UE to the plurality of second UEs when the first UE is in non-line of sight (NLOS) of at least of the plurality of second UEs.

10. The method of any clause 1-9, wherein transmitting the pre-collision message from the first UE to the plurality of second UEs, comprises:

selecting a resource for transmission of the pre-collision message;

queuing the pre-collision message for transmission from the first UE to the plurality of second UEs; and monitoring a communication channel to determine whether another UE has transmitted a separate pre-collision message while the pre-collision message is queued for transmission.

11. The method of any clause 1-10, further comprising:

transmitting the pre-collision message from the first UE to the plurality of second UEs prior to expiration of a time period based on determining that the another UE has not transmitted a separate pre-collision message on the communication channel identifying the potential resource collision.

12. An apparatus for wireless communication, comprising:

a memory storing computer-executable instructions; and at least one processor coupled to the memory and configured to execute the instructions to:

decode, at a first user equipment (UE), sidelink control information (SCI) transmitted by a plurality of second UEs reserving a set of resources for sidelink transmission to the first UE;

detect, at the first UE, a potential resource collision for the plurality of second UEs at the set of resources based on decoding of the SCI;

generate a pre-collision message that identifies the set of resources that are susceptible to the potential resource collision; and transmit the pre-collision message from the first UE to the plurality of second UEs.

13. The apparatus of clause 12, wherein the at least one processor is configured to execute the instructions to perform methods of claims 2-11.

14. A non-transitory computer readable medium storing instructions, executable by a processor, for wireless communications, comprising instructions for:

decoding, at a first user equipment (UE), sidelink control information (SCI) transmitted by a plurality of second UEs reserving a set of resources for sidelink transmission to the first UE;

detecting, at the first UE, a potential resource collision from the plurality of second UEs at the set of resources based on decoding of the SCI;

generating a pre-collision message that identifies the set of resources that are susceptible to the potential resource collision; and transmitting the pre-collision message from the first UE to the plurality of second UEs.

15. The non-transitory computer readable medium of clause 14 wherein the instructions, executable by the processor, perform methods of any clause 1-11.

16. An apparatus for wireless communications, comprising:

means for decoding, at a first user equipment (UE), sidelink control information (SCI) transmitted by a plurality of second UEs reserving a set of resources for sidelink transmission to the first UE;

means for detecting, at the first UE, a potential resource collision from the plurality of second UEs at the set of resources based on decoding of the SCI;

means for generating a pre-collision message that identifies the set of resources that are susceptible to the potential resource collision; and means for transmitting the pre-collision message from the first UE to the plurality of second UEs.

17. The apparatus of clause 16, comprising means for performing any clauses 1-11. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,”

"mechanism," "element," "device," and the like may not be a substitute for the word "means." As such, no claim element is to be construed as a means plus function unless the element is expressly recited using the phrase "means for."

The invention claimed is:

1. A method of wireless communication, comprising:

decoding, at a first user equipment (UE), sidelink control information (SCI) transmitted by a plurality of second UEs reserving a set of resources for sidelink transmission to the first UE;

detecting, at the first UE, a potential resource collision from the plurality of second UEs at the set of resources based on decoding of the SCI;

generating a pre-collision message that identifies the set of resources that are susceptible to the potential resource collision; and transmitting the pre-collision message from the first UE to the plurality of second UEs, wherein transmitting the pre-collision message from the first UE to the plurality of second UEs, comprises:

selecting a resource for transmission of the pre-collision message;

queuing the pre-collision message for transmission from the first UE to the plurality of second UEs; and monitoring a communication channel to determine whether another UE has transmitted a separate pre-collision message while the pre-collision message is queued for transmission.

2. The method of claim 1, wherein transmitting the pre-collision message from the first UE to the plurality of second UEs, comprises:

transmitting the pre-collision message on a resource set reserved for inter-coordination messages.

3. The method of claim 1, wherein transmitting the pre-collision message from the first UE to the plurality of second UEs, comprises:

transmitting the pre-collision message using orthogonal resource set with inter-coordination messages.

4. The method of claim 3, wherein the orthogonal resource set is orthogonal to data transmission or share same resource set as the data transmission.

5. The method of claim 1, wherein detecting the potential resource collision from the plurality of second UEs at the set of resources comprises:

detecting that the plurality of second UEs are scheduled for sidelink transmission over either overlapping resources or adjacent resources in a frequency domain such that there is a potential for inter-band leakage (IBE).

6. The method of claim 1, wherein detecting the potential resource collision from the plurality of second UEs at the set of resources comprises:

measuring a reference signal received power (RSRP) for a signal between the first UE and at least one of the plurality of second UEs; and calculating that the RSRP measured for the signal between the first UE and at least one of the plurality of second UEs is less than a threshold.

7. The method of claim 6, further comprising:

identifying that at least two or more of the plurality of second UEs have reserved adjacent frequency resources in an overlapping time slot.

8. The method of claim 1, wherein transmitting the pre-collision message from the first UE to the plurality of second UEs, comprises:

measuring one or both of a reference signal received power (RSRP) or distance between the first UE and at least one of the plurality of second UEs; and calculating that one or both of the RSRP or the distance between the first UE and at least one of the plurality of second UEs is less than a threshold.

9. The method of claim 8, further comprising:

transmitting the pre-collision message from the first UE to the plurality of second UEs when the first UE is in non-line of sight (NLOS) of at least of the plurality of second UEs.

10. The method of claim 1, further comprising:

transmitting the pre-collision message from the first UE to the plurality of second UEs prior to expiration of a time period based on determining that the another UE has not transmitted a separate pre-collision message on the communication channel identifying the potential resource collision.

11. A first user equipment (UE) for wireless communication, comprising:

one or more memories, individually or in combination, having instructions; and one or more processors, individually or in combination, coupled to the one or more memories and configured to execute the instructions to:

decode, at the first UE, sidelink control information (SCI) transmitted by a plurality of second UEs reserving a set of resources for sidelink transmission to the first UE;

detect, at the first UE, a potential resource collision for the plurality of second UEs at the set of resources based on decoding of the SCI;

generate a pre-collision message that identifies the set of resources that are susceptible to the potential resource collision; and transmit the pre-collision message from the first UE to the plurality of second UEs, wherein the one or more processors configured to execute the instructions to transmit the pre-collision message from the first UE to the plurality of second UEs, are further configured to:

select a resource for transmission of the pre-collision message;

queue the pre-collision message for transmission from the first UE to the plurality of second UEs; and monitor a communication channel to determine whether another UE has transmitted a separate pre-collision message while the pre-collision message is queued for transmission.

12. The first UE of claim 11, wherein the one or more processors are further configured to execute the instructions to:

transmit the pre-collision message on a resource set reserved for inter-coordination messages.

13. The first UE of claim 11, wherein the one or more processors are configured to execute the instructions to:

transmit the pre-collision message using orthogonal resource set with inter-coordination messages.

14. The first UE of claim 13, wherein the orthogonal resource set is orthogonal to data transmission or share same resource set as the data transmission.

15. The first UE of claim 11, wherein the one or more processors configured to execute the instructions to detect the potential resource collision from the plurality of second UEs at the set of resources are further configured to:

detect that the plurality of second UEs are scheduled for sidelink transmission over either overlapping resources or adjacent resources in a frequency domain such that there is a potential for inter-band leakage (IBE).

16. The first UE of claim 11, wherein the one or more processors configured to execute the instructions to detect the potential resource collision from the plurality of second UEs at the set of resources are further configured to:

measure a reference signal received power (RSRP) for a signal between the first UE and at least one of the plurality of second UEs; and calculate that the RSRP measured for the signal between the first UE and at least one of the plurality of second UEs is less than a threshold.

17. The first UE of claim 16, wherein the one or more processors are further configured to execute the instructions to:

identify that at least two or more of the plurality of second UEs have reserved adjacent frequency resources in an overlapping time slot.

18. The first UE of claim 11, wherein the one or more processors configured to execute the instructions to transmit the pre-collision message from the first UE to the plurality of second UEs, are further configured to:

measure one or both of a reference signal received power (RSRP) or distance between the first UE and at least one of the plurality of second UEs; and calculate that one or both of the RSRP or the distance between the first UE and at least one of the plurality of second UEs is less than a threshold.

19. The first UE of claim 18, wherein the one or more processors are further configured to execute the instructions to:

transmitting the pre-collision message from the first UE to the plurality of second UEs when the first UE is in non-line of sight (NLOS) of at least of the plurality of second UEs.

20. The first UE of claim 11, wherein the one or more processors are further configured to execute the instructions to:

transmit the pre-collision message from the first UE to the plurality of second UEs prior to expiration of a time period based on determining that the another UE has not transmitted a separate pre-collision message on the communication channel identifying the potential resource collision.

* * * * *